Patented Jan. 9, 1940

2,186,419

UNITED STATES PATENT OFFICE 2,186,419

PROCESS FOR THE MANUFACTURE OF MERCAPTOTHIAZOLES

Roger A. Mathes, Akron, Ohio, assignor to The B. F. Goodrich Company, New York, N. Y., a corporation of New York No Drawing. Application September 30, 1937, Serial No. 166,590

13 Claims. (Cl. 260—302)

This invention relates to an improved process for the manufacture of mercaptothiazoles.

The object of the invention is to provide a commercially useful method for the manufacture of mercaptothiazoles at an economical cost. This object is accomplished by an improved technique for carrying out the reaction, making possible, with an inexpensive process, the preparation of mercaptothiazoles of high purity and in good yields.

Methods described in the literature designate the use of alcohol or ether as a reaction diluent for the preparation of mercaptothiazoles by the interaction of ammonium dithiocarbamate and an organic compound containing the grouping

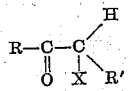

where R and R' are hydrogen or monovalent groups and X is halogen. The reaction may be represented in the following manner:

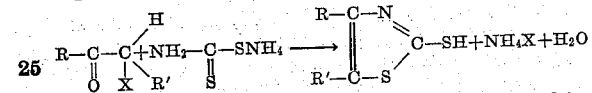

According to my invention, ammonium dithiocarbamate or an alkali metal salt of dithiocarbamic acid, dissolved in water, is reacted with an organic compound of the general formula

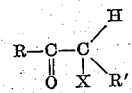

where R is a hydrocarbon group which may be joined to R'; R' is hydrogen or an alkyl group which may be joined to R; X is halogen. By the use of water as the reaction diluent the disadvantages in the use of alcohol or ether are overcome.

One of the most significant advantages in the use of water as the reaction diluent is the precipitation of the mercaptothiazoles in the form of a suspension which may be filtered. When alcohol or ether is used, the mercaptothiazoles formed are in solution. The recovery of mercaptothiazoles from an ether or alcohol solution is commercially disadvantageous. Both the purity and yield of mercaptothiazole are improved by using water as the reaction diluent.

A halogenated organic compound of the general formula

is added to a water solution of ammonium dithiocarbamate, in which its solubility is slight, and an oily layer is thus formed. When agitation is started, heat is almost immediately developed and the oily layer disappears. The clear solution resulting is due to the formation of an intermediate, a water soluble dithiourethane. This intermediate very quickly loses water and rearranges to form the mercaptothiazole which comes down as an oily layer, immediately solidifying. Vigorous stirring disperses this oily layer and the mercaptothiazole is converted to a finely divided precipitate.

The rapidity with which the reaction goes to completion is believed responsible, in part, for the high yield of mercaptothiazole obtained. The ammonium dithiocarbamate enters into the reaction before any appreciable decomposition takes place. When alcohol or ether is used as the diluent, the time required to carry out the reaction is much longer. During this reaction period decomposition of ammonium dithiocarbamate takes place.

Among the organic compounds which may be used in my process are the alpha halogenated ketones as chloracetone, 1-chlorobutanone-2, 3-chlorobutanone-2, 3-chloropentanone-2, phenacyl chloride, p-methyl phenacyl chloride, alpha chlorocyclohexanone, alpha chlorocyclopentanone.

This invention is not necessarily restricted to the use of alpha halogenated ketones. It is my intention to include other alpha halogenated organic compounds which react with a water solution of ammonium dithiocarbamate, or with an alkali salt of dithiocarbamate acid to form mercaptothiazoles. Such a class of compounds are the alpha halogenated beta ketonic esters, as ethyl alpha chloroacetoacetate and methyl alpha chloroacetoacetate.

In certain of the specific examples which follow the nomenclature depends upon the numbering of the cyclic atoms. In order to give a definite understanding of the position of the various atoms, the group is set forth as is numbered:

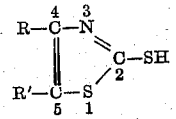

The reaction is preferably carried out in a reactor provided with an agitator capable of furnishing vigorous stirring.

One molecular proportion of ammonium dithiocarbamate is dissolved in water, a 20% solution being a convenient concentration for the reaction. To this solution is added, as rapidly as possible, one molecular proportion of the alpha halogenated ketone. Vigorous agitation is started, the temperature rises, and the mercaptothiazoles precipitate to give a thick suspension. After continuing agitation for a short time, the suspension is cooled by the addition of ice, filtered and washed with water. The product is dried at room temperature. A somewhat increased yield is obtained if the reaction mixture is allowed to stand for several hours before filtering.

The concentration of the water solution of ammonium dithiocarbamate may be varied to suit the conditions of the reaction. The reactants need not necessarily be used in equi-molecular proportions but an excess of either one may at times be desirable. The alpha halogenated ketone may be added slowly over a period of time or may be added at the same time as a solution of ammonium dithiocarbamate, to warm water. In some instances the application of heat is necessary, the heat of reaction being insufficient to carry out the process. Cooling by the addition of ice, while not necessary, is a convenient means of lowering the temperature of the reaction mixture.

When the mercaptothiazoles tend to come down in a temporarily oily condition, rather than as a crystalline precipitate, the addition of dispersing agents such as the sodium salt of isopropyl naphthalene sulfonic acid, is an aid in the process. The addition of a small percentage of a water soluble organic solvent, as acetone, is beneficial when the oily condition of the precipitated mercaptothiazoles is persistent. Such a condition may be caused by impure chloroketones. The oily impurities are dissolved leaving a precipitate free from such objectionable material. Alternatively, the water soluble organic solvent may be added before the reaction takes place, in cases where the chloroketones are known to contain more than the usual amount of impurities.

Vapors coming from the warm reaction mixture carry impurities and their elimination aids in the production of mercaptothiazoles of high purity. A short steam distillation by blowing live steam into the reaction mixture and removing the condensate is therefore also advantageous.

When a mixture of 1-chlorobutanone-2 and 3-chlorobutanone-2, as obtained by the chlorination of 2-butanone, is reacted with ammonium dithiocarbamate, a mixture of 2-mercapto 4-ethylthiazole and 2-mercapto 4,5-dimethyl thiazole is obtained. The separation of this mixture into the two components may be desirable. Such a separation is readily carried out by extracting the mixture with a dilute solution of a mild alkali such as alkali carbonate or aqueous ammonia. 2-mercapto 4-ethylthiazole dissolves, leaving 2-mercapto 4,5-dimethyl thiazole as a suspended solid.

The following examples describe the process more specifically, but it will be understood that the invention is not limited to these details. Wide variations both in the process and amounts of reactants are possible without materially affecting the results.

*Example 1*

34.5 lbs. of ammonium dithiocarbamate are dissolved in 21 gal. of water in a reactor provided with an agitator capable of furnishing vigorous stirring.

33.5 lbs. of 3-chlorobutanone-2 are added rapidly, and agitation is started. The reaction takes place almost at once, the temperature rising to about 80° C. The 2-mercapto 4,5-dimethyl thiazole precipitates as a finely divided, white colored solid. After agitation is allowed to continue for fifteen minutes, 100 lbs. of crushed ice are added. Agitation is allowed to continue one hour longer and the mixture is filtered and washed with cold water.

The product is spread on trays to dry at room temperature.

41.3 lbs. of 2-mercapto 4,5-dimethyl thiazole are obtained, representing a 90.5% yield. The melting point of the product is 159–162° C.

*Example 2*

36 g. of ammonium dithiocarbamate are dissolved in 200 cc. of water in a reaction flask provided with a stirrer. 32 g. of 1-chloro-butanone-2 are added rapidly and agitation is started.

The reaction takes place almost at once, with a rise in temperature. The 2-mercapto 5-ethylthiazole comes down as a white finely divided precipitate. After continuing agitation for a short time, the mixture is allowed to stand for two days. The slurry is then filtered, washed and dried at room temperature.

42.4 g. of 2-mercapto 5-ethylthiazole are obtained, representing a 97.5% yield. The melting point of the product is 75–81° C.

*Example 3*

148 lbs. of ammonium dithiocarbamate dissolved in 50 gal. of water are put in a reactor provided with an agitator capable of furnishing vigorous stirring.

135 lbs. of a mixture of 1-chlorobutanone-2 and 3-chlorobutanone-2 are added rapidly, and agitation is started. The reaction takes place almost immediately, the temperature rising to about 90° C. The mixture of 2-mercapto 4-ethylthiazole and 2-mercapto 4,5-dimethyl thiazole comes down as a finely divided, cream colored precipitate. After agitation has continued for about ten minutes, 150 lbs. of crushed ice are added. Agitation is continued for an hour longer and the reaction mixture is allowed to stand for twelve hours. The slurry is then filtered, washed with cold water and spread on trays to dry in a room maintained at 40° C.

161 lbs. of a mixture of 2-mercapto 4-ethyl thiazole and 2-mercapto 4,5-dimethyl thiazole are obtained, representing an 87.5% yield. The melting point of the product is 137–153° C.

If it is desired to separate this mixture into its constituents, 50 lbs. of the mixture are suspended in 25 gal. of water. 10 lbs. of sodium carbonate are added and the mixture agitated for about one hour. The mixture is filtered, washed with cold water and spread on trays to dry at room temperature. 43 lbs. of 2-mercapto 4,5-dimethyl thiazole are obtained, having a melting point of 158–160° C. 2-mercapto 4-ethyl thiazole remains in the filtrate, from which it may be recovered by acidification or by precipitation in the form of a heavy metal salt, for example, the zinc salt.

*Example 4*

159 g. of ammonium dithiocarbamate are dissolved in one liter of water in a reaction flask provided with a stirrer. 147 g. of chloroacetone are added rapidly and agitation is started.

The reaction takes place almost immediately, the temperature rising to 52° C. The 2-mercapto 4-methyl thiazole comes down as a white, finely divided precipitate. The reaction mixture is cooled, filtered and washed with cold water. The product is dried at room temperature.

148.5 g. of 2-mercapto 4-methyl thiazole are obtained, representing a 78.5% yield. The melting point of the product is 82–84° C.

*Example 5*

110 g. of ammonium dithiocarbamate are dissolved in 1.5 liters of water in a reaction flask provided with a stirrer. 154.5 g. of phenacyl chloride are added and agitation is started.

The mixture is warmed with a burner to about 40° C. when the reaction starts. The 2-mercapto 4-phenyl thiazole comes down as a finely divided, white precipitate. Agitation is continued for an hour, with cooling. The reaction mixture is filtered, washed with cold water and spread out to dry at room temperature.

184 g. of 2-mercapto 4-phenyl thiazole are obtained, representing a 95.3% yield. The melting point of the product is 160–162° C.

From the data herein presented, the fact will be readily apparent that this invention constitutes a distinct improvement over previous processes for preparing mercaptothiazoles.

When water is used as the reaction diluent, the mercaptothiazoles may be filtered from the water suspension, the solubility in cold water being in general low enough that the losses due to solubility can be neglected. The ammonium chloride formed in the reaction is discarded along with the filtrate. When alcohol or ether is used as the reaction diluent, the suspension consists of ammonium chloride while the mercaptothiazoles remain in solution. The recovery of the product from solution in a volatile solvent presents a difficult problem on a commercial scale.

The purity of the crude reaction product using water as the reaction diluent is such that for commercial use further purification is not necessary. Less pure products are obtained when alcohol or ether is used as the diluent. Higher yields are obtained when water is used as the diluent. The aqueous method eliminates the problem of recovering a volatile organic solvent. The time required for the reaction carried out in water is much shorter than when alcohol or ether is used. The fire hazard involved in the handling of organic solvents is eliminated by the use of water.

The improvements in these important commercial aspects make possible the manufacture of mercaptothiazoles by my process at an economical cost.

I claim:

1. A process for the manufacture of mercaptothiazoles which comprises reacting a compound of the class consisting of alkali metal salts and the ammonium salt of dithiocarbamic acid, dissolved in water, with an alpha halogenated ketone selected from the group consisting of compounds of the formula

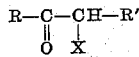

and compounds of the formula

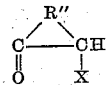

where R is a hydrocarbon group, R' is selected from the group consisting of hydrogen and alkyl, R'' is an alkylene group, and X is halogen.

2. A process for the manufacture of mercaptothiazoles which comprises reacting ammonium dithiocarbamate, dissolved in water, with an alpha halogenated ketone selected from the group consisting of compounds of the formula

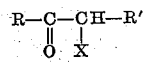

and compounds of the formula

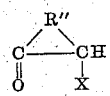

where R is a hydrocarbon group, R' is selected from the group consisting of hydrogen and alkyl, R'' is an alkylene group, and X is halogen.

3. A process according to claim 2 where the reactants are present in substantially equi-molecular proportions.

4. A process for the manufacture of mercaptothiazoles which comprises reacting substantially equi-molecular proportions of ammonium dithiocarbamate, dissolved in water containing a water soluble organic solvent, and an alpha halogenated ketone selected from the group consisting of compounds of the formula

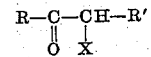

and compounds of the formula

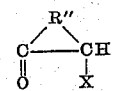

where R is a hydrocarbon group, R' is selected from the group consisting of hydrogen and alkyl, R'' is an alkylene group, and X is halogen.

5. A process for the manufacture of mercaptothiazoles which comprises reacting substantially equi-molecular proportions of ammonium dithiocarbamate, dissolved in water, and an alpha halogenated ketone selected from the group consisting of compounds of the formula

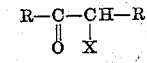

and compounds of the formula

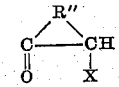

where R is a hydrocarbon group, R' is selected from the group consisting of hydrogen and alkyl, R'' is an alkylene group, and X is halogen.

6. A process for the manufacture of mercapto alkyl thiazoles which comprises reacting ammonium dithiocarbamate dissolved in water with a mixture of 1-chlorobutanone-2 and 3-chlorobutanone-2.

7. A process for the manufacture of mercaptoalkylthiazoles which comprises reacting an alkali salt of dithiocarbamic acid dissolved in water with a mixture of 1-chlorobutanone-2 and 3-chlorobutanone-2.

8. A process according to claim 6 where the reactants are present in substantially equi-molecular proportions.

9. A process for the manufacture of mercaptoalkylthiazoles which comprises reacting substantially equi-molecular proportions of ammonium dithiocarbamate, dissolved in water containing a water soluble organic solvent, and a mixture of 1-chlorobutanone-2 and 3-chlorobutanone-2.

10. A process for the manufacture of mercaptoalkylthiazoles which comprises reacting substantially equi-molecular proportions of ammonium dithiocarbamate dissolved in water and a mixture of 1-chlorobutanone-2 and 3-chlorobutanone-2, and removing the solid, precipitated reaction product by filtration.

11. A process for the separation of a mixture of 2-mercapto 4-ethyl thiazole and 2-mercapto 4,5 dimethyl thiazole formed by the interaction of 1-chlorobutanone-2 and 3-chlorobutanone-2 and ammonium dithiocarbamate, which comprises extraction of the 2-mercapto 4-ethyl thiazole from the 2-mercapto 4,5-dimethyl thiazole with an aqueous solution of a mild alkali.

12. A process for the manufacture of a mercaptoalkylthiazole which comprises reacting ammonium dithiocarbamate dissolved in water, with an alpha-chlor dialkyl ketone.

13. A process for the manufacture of 2-mercapto 4,5-dimethyl thiazole which comprises reacting ammonium dithiocarbamate, dissolved in water, with a mixture of 1-chlorobutanone-2 and 3-chlorobutanone-2, removing the solid, precipitated reaction product by filtration, and separating the 2-mercapto 4,5-dimethyl thiazole by extracting the other product therefrom with an aqueous solution of a mild alkali.

ROGER A. MATHES.